Feb. 11, 1936.    N. B. REYNOLDS    2,030,397
COMPOSITE GLASS CONTAINER
Filed Dec. 17, 1932

Inventor:
Neil B. Reynolds,
by Charles E. Tullar
His Attorney.

Patented Feb. 11, 1936

2,030,397

UNITED STATES PATENT OFFICE 2,030,397

COMPOSITE GLASS CONTAINER

Neil B. Reynolds, Scotia, N. Y., assignor to General Electric Company, a corporation of New York Application December 17, 1932, Serial No. 647,750

8 Claims. (Cl. 176—122)

This application is a continuation in part of my prior application Serial No. 581,790, filed December 18, 1931.

The present invention relates to the manufacture of fabricated glass articles, such for example, as bulbs or tubes. It is the object of my invention to provide glass articles capable of resisting the chemical effect of alkali vapors or other chemicals.

My improved glass is applicable particularly to the fabrication of vapor electric devices, such for example, as positive column lamps containing sodium or other alkali metal vapor. Alkali metal vapor when heated and electrically activated produces darkening of commercially available glasses, including even lead-free glasses. It is probable that such darkening is due to chemical reduction to metallic silicon of silicates present in such glasses. It is possible also that the darkening of some kinds of glass by alkali vapor is due to the introduction of the alkali metal into the glass.

It has been suggested to provide bulbs, tubes or other vessels with a layer of borate glass, the two layers of glass to be blown or formed simultaneously from a molten state.

There are a number of glasses, however, which, while resistant to alkali metal vapor cannot be fabricated in accordance with this method because of their short working range. Such glasses, while perhaps the most resistant to vapors of sodium, or other alkali metal, have the characteristic of changing too abruptly in viscosity when passing from the solid to the liquid state. Such glasses appeared too unavailable for the manufacture of alkali-vapor electric devices.

In accordance with my invention, ordinary commercial glassware, that is, bulbs, tubing, or the like, obtainable on the market, is provided with a layer of glass resistant to alkali metal vapor, by fusing such glass thereon while it is in a comminuted state. For example, alkali-vapor resistant glass is finely divided, then applied to the surface to be protected and finally the material thus deposited is sintered or fused in situ.

In accordance with another feature of my invention, I have provided a novel composite glass which is stable under the conditions above discussed which comprises a suitable foundation glass and a glaze or coating thereon of phosphate glass which is not darkened by contact with heated and ionized alkali vapor.

Figure 1:
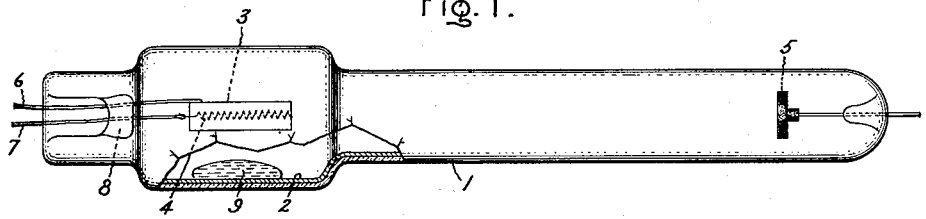
Figure 2:
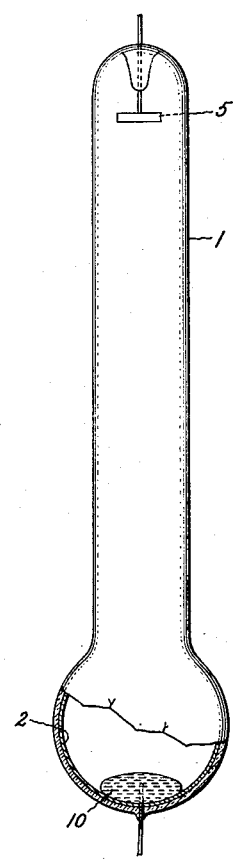

The accompanying drawing shows two forms of electrical discharge devices to which my invention is applicable. Fig. 1 shows in side elevation with the wall partly broken away, a vapor lamp having a thermionic cathode, and having its inner wall protected with a phosphate glaze. Fig. 2 shows a side elevation with the wall in part broken away of an electric lamp having a vaporizable non-thermionic cathode and provided on the inside with a coating of phosphate glass.

The following are examples of glasses capable of use in accordance with my invention, namely, by powdering the glass and applying the powder preferably while suspended in a suitable liquid medium on the foundation glass.

*First example.*—A glass is formed by fusing in a suitable crucible a mixture of 65 parts of sodium metaphosphate ($Na_4P_4O_{12}$) and 35 parts of calcium carbonate ($CaCO_3$), these proportions being by weight.

*Second example.*—A glass is made by the fusion of a mixture of 35 parts by weight of metaphosphoric acid ($HPO_3$), 35 parts of sodium metaphosphate ($Na_4P_4O_{12}$) and 30 parts of calcium carbonate ($CaCO_3$), these proportions being by weight.

*Third example.*—Glasses resistant to alkali vapor, which is best applied in accordance with my invention, are silica-borate glasses containing high percentages of boric oxide ($B_2O_3$). A glass representative of this class may be made by the fusion of the following ingredients.

| | Parts by weight |
|---|---|
| Silica | 25.0 |
| Boric acid | 83.2 |
| Aluminum oxide | 13.0 |
| Sodium carbonate | 8.6 |
| Calcium carbonate | 17.9 |

*Fourth example.*—An alkali-resistant glass having a short working range may be made by fusion of the following ingredients which include a high percentage of alkali-earth and no silica:

| | Parts by weight |
|---|---|
| Barium carbonate | 66.8 |
| Aluminum oxide | 26.0 |
| Boric acid | 37.3 |
| Zinc oxide | 1.0 |

When devices such as shown in the drawing are to be provided with a protective coating upon the inner surface, a glass such as one of those above described is ground, or otherwise comminuted, to a state of sufficient fineness to give a good suspension. It is suspended in a suitable medium, such for example as a solution of nitrocellulose in a solvent, such as amyl acetate, and spread in any convenient manner, such as by painting, atomizing, or flowing, over the surface of the glass to be coated, which in the case of the device illustrated, consists of a tubular container 1. The powder also may be applied in the dry state, that is, dusted on the foundation surface. This container may consist of suitable heat-resisting glass, which is capable of being fashioned into desired form by known methods, such, for example, as a suitable boro-silicate glass, or a lime glass, which are commonly sold in the market. The foundation glass and the coating in general should have coefficients of expansion sufficiently close to avoid cracking upon cooling.

When the tube, bulb, or other article is to be protected against the action of a highly chemically active substance, such as sodium vapor, the binder, if one is used, is removed by volatilization and heat is applied externally to sinter or fuse the powdered glass so as to form a glaze as indicated at 2 in both figures of the drawing. The heat preferably should be carried almost to the softening temperature of the foundation glass. While in some cases the glass applied in accordance with my invention may be sintered or fritted short of fusion, I prefer to heat the glass to a temperature of fusion. When the alkali-resisting coating is sintered it has a light-diffusing, translucent appearance. When it is fused it may be clear or nearly so.

After the envelope for a lamp or similar device has been thus coated, electrodes are introduced in the usual manner. For example, the device of Fig. 1 contains a thermionic cathode comprising a hollow cylinder 3 coated with barium oxide or other emissive material and provided on the inside with a heater 4 of tungsten or other suitable refractory metal. The anode 5 may consist of graphite or of tungsten or other suitable refractory metal. The cathode is mounted upon leading-in conductors 6, 7 sealed into a stem 8 as usual. The stem 8 may be coated separately before being sealed into the container, the sealing zone preferably being left uncoated.

The device contains a quantity of sodium or other alkali metal, as indicated at 9. In some cases low pressure of inert gas, such as neon or argon, also may be present in the device. The lamp shown in Fig. 2 contains a cathode 10 consisting of a mass of sodium or other alkali metal and in other respects is similar to the device shown in Fig. 1.

The operation of devices thus provided upon their interior with glass capable of resisting alkali vapor shows that they may be operated for a useful commercial life without appreciable discoloration.

What I claim as new and desire to secure by Letters Patent of the United States is:

1. An electrical discharge device comprising a sealed container of fixed form constituted mainly of silicate glass, a charge of alkali metal therein, means for conducting electric current through the vapor of said metal and an inner coating of glass of materially lower fusing temperature, resistant chemically to alkali vapor, and having a short working range and fused in situ to said formed container.

2. An electrical discharge device comprising a shaped envelope made of silica glass having an inner coating thereon comprising particles of a boro-silicate alkali-resistant glass having a short working range, said particles being fused in situ to one another and to said shaped envelope to form a light-diffusing layer, electrodes operatively disposed therein, and a charge of alkali vapor contained within said envelope.

3. An electrical discharge device comprising a glass envelope of fixed form, electrodes operatively disposed therein, a charge of alkali-vapor yielding material, and a protective coating on the inner surface of said envelope comprising particles sintered to one another and to said envelope in situ and being made of alkali-resisting glass which has a short working range.

4. A composite glass container comprising a foundation of silicate glass of fixed form and an interior glaze fused in situ thereon being made of an alkali-resistant glass comprising a borate glass containing a major proportion of barium, and a less proportion of alumina.

5. An electrical discharge device comprising a sealed container of fixed form constituted mainly of silicate glass, a charge of alkali metal therein, means for conducting electric current through the vapor of said metal and an inner coating of particles of glass fused in situ to the inner surface of said formed container, said coating being resistant chemically to alkali vapor.

6. An alkali vapor electric lamp, the envelope of which is made of silicate glass having an interior glaze thereon of phosphate glass which is resistant chemically to alkali vapor.

7. A composite glass container comprising a wall member of silicate glass and a coating thereon of a complex phosphate of sodium and calcium.

8. A composite fused glass container for alkali vapor devices comprising a wall of silicate glass and a coating on the inner surface thereof comprising phosphate glass which is resistant chemically to alkali vapor.

NEIL B. REYNOLDS.